United States Patent [19]
Lim et al.

[11] Patent Number: 5,689,723
[45] Date of Patent: Nov. 18, 1997

[54] METHOD FOR ALLOWING SINGLE-BYTE CHARACTER SET AND DOUBLE-BYTE CHARACTER SET FONTS IN A DOUBLE-BYTE CHARACTER SET CODE PAGE

[75] Inventors: Chan S. Lim, Potomac; Gregg A. Salsi, Germantown, both of Md.; Isao Nozaki, Yamato, Japan

[73] Assignee: International Business Machines Corp, Armonk, N.Y.

[21] Appl. No.: 13,271

[22] Filed: Feb. 3, 1993

[51] Int. Cl.⁶ .................................................. G09G 1/00
[52] U.S. Cl. .................................... 395/805; 395/798
[58] Field of Search .......................... 395/144–151, 395/792, 793, 798, 805, 774; 345/171, 127–130, 23–26, 143, 116, 192–195; 364/419

[56] References Cited

U.S. PATENT DOCUMENTS

| | | | |
|---|---|---|---|
| 4,498,148 | 2/1985 | Glickman | 364/900 |
| 4,543,631 | 9/1985 | Kurosu et al. | 364/200 |
| 4,559,614 | 12/1985 | Peek et al. | 364/900 |
| 4,737,779 | 4/1988 | Somigli et al. | 340/745 |
| 4,745,561 | 5/1988 | Hirosawa et al. | 364/523 |
| 4,751,740 | 6/1988 | Wright | 382/1 |
| 4,755,955 | 7/1988 | Kimura et al. | 364/518 |
| 4,827,530 | 5/1989 | Yamaguchi et al. | 382/13 |
| 4,831,529 | 5/1989 | Miike et al. | 364/419 |
| 4,868,913 | 9/1989 | Tse-Kai | 340/711 |
| 4,933,880 | 6/1990 | Borgendale et al. | 364/523 |
| 4,949,287 | 8/1990 | Yamaguchi et al. | 364/523 |
| 4,954,979 | 9/1990 | Elbner et al. | 364/900 |
| 5,005,137 | 4/1991 | Ernst | 364/514 |
| 5,043,712 | 8/1991 | Kihara et al. | 340/735 |
| 5,079,701 | 1/1992 | Kuga et al. | 364/419 |
| 5,084,817 | 1/1992 | Kumano et al. | 364/419 |
| 5,084,820 | 1/1992 | Nagaya et al. | 364/419 |
| 5,091,878 | 2/1992 | Nagasawa et al. | 364/419 |
| 5,257,351 | 10/1993 | Leonard et al. | 395/150 |
| 5,287,094 | 2/1994 | Yi | 345/143 |
| 5,309,358 | 5/1994 | Andrews et al. | 364/419.01 |
| 5,317,509 | 5/1994 | Caldwell | 364/419.08 |

OTHER PUBLICATIONS

Japanese PUPA number 1–261774, Oct. 18, 1989, pp. 1–2.
Inside Macintosh, vol. VI, Apple Computer, Inc., Cupertino, CA, Second printing, Jun. 1991, pp. 15-4 through 15–39.
Karew Acerson, *WordPerfect: The Complete Reference*, Eds., p. 177–179, 1988.
IBM Manual, "DOS Bunsho (Language) Program II Operation Guide" (N:SH18-2131-2) (Partial Translation of p. 79).

*Primary Examiner*—Phu K. Nguyen
*Assistant Examiner*—Cliff N. Vo
*Attorney, Agent, or Firm*—Edward H. Duffield

[57] ABSTRACT

The method of the invention allows both single-byte character set (SBCS) and double-byte character set (DBCS) fonts in a DBCS code page. The invention stores the SBCS and DBCS text of the document in separate areas. Each area contains the following specific information about the text: the actual text itself, the length in bytes of the text, the horizontal starting position of the text, the font attributes for that text, a flag to indicate that the text is SBCS or DBCS text, and the value which points to the next area containing some text. The font attributes contain information such as the font typeface name, point size, color, weight, width, and the value to indicate whether the font type is an SBCS or a DBCS font type. A document is then set up to use different fonts, SBCS or DBCS, for specific sections of text and alternating back and forth between the fonts as many times as is necessary. The text of the document that uses the different fonts will be in separate areas and each area will contain its own text and font specific information.

3 Claims, 11 Drawing Sheets

FIG. 1

| LINGUIST | SBCS DBCS | YOMI KANJI NORM CTRL | HIRAGANA KATAKANA KANJI ENGLISH | FONT INDEX | TEXT LENGTH | PREV TEXT NODE | NEXT TEXT NODE | TEXT POINTER |
|---|---|---|---|---|---|---|---|---|

1. LINGUIST
   THIS INDICATES WHETHER THE TEXT IN THIS TEXT NODE IS SPELLED CORRECTLY OR IT HAS A SPELLING ERROR.

2. SBCS/DBCS
   INDICATES WHETHER THIS TEXT NODE CONTAINS SINGLE-BYTE TEXT OR DOUBLE-BYTE TEXT. TEXT OF DIFFERENT SIZES WILL NOT APPEAR IN THE SAME TEXT NODE.

3. YOMI/KANJI/NORM/CTRL
   INDICATES THE STATE THAT THE TEXT IN THE CURRENT TEXT NODE IS IN:

-YOMI: TEXT (USUALLY HIRAGANA OR KATAKANA) WHICH HAS BEEN ENTERED IN CONVERSION MODE BUT WHICH HAS NOT YET BEEN CONVERTED TO KANJI. TEXT WILL REMAIN IN THIS STATE REGARDLESS OF THE USERS ACTIONS, UNLESS HE CONVERTS IT, NORMALIZES IT, OR DELETES IT.

-KANJI: TEXT WHICH HAS BEEN CONVERTED TO KANJI CHARACTERS FROM YOMI BUT WHICH HAS NOT YET BEEN NORMALIZED. TEXT IN THIS STATE WILL STILL REFERENCE ALL OF THE NECESSARY INFORMATION TO PERFORM FUTURE KANA-KANJI CONVERSION FUNCTIONS AND WILL REMAIN IN THIS STATE UNTIL THE USER UNCONVERTS IT, NORMALIZES IT, OR DELETES IT.

-NORM: TEXT WHICH IS NEITHER IN YOMI OR KANJI STATE. THIS IS THE STANDARD STATE OF ENGLISH TEXT AND OF JAPANESE TEXT WHICH WILL NO LONGER BE USED IN ANY CONVERSION ROUTINES.

-CTRL: TEXT WHICH IS CONTROL INFORMATION CONTAINING THE ORIGINAL YOMI WHICH CONVERTED TO A PARTICULAR KANJI PHRASE AND OTHER CONTROL DATA PASSED BACK FROM THE SYSTEM CONVERSION ROUTINES. THERE IS ONE OF THESE TEXT NODES ATTACHED TO EACH KANJI-STATE PHRASE IN THE DOCUMENT AND THEY ARE NOT DISPLAYED. THEY CONTAIN ALL THE INFORMATION NECESSARY TO DO FURTHER KANA-KANJI CONVERSION ROUTINES ON THE ASSOCIATED KANJI PHRASE IF REQUESTED.

TEXT OF DIFFERENT STATES WILL NEVER EXIST IN THE SAME TEXT NODE.

| FONT ATTRIBUTES | FONT METRICS | CODE PAGE | NEXT FONT |
|---|---|---|---|

FIG. 4

1. FONT ATTRIBUTES
   THIS REPRESENTS THE VARIOUS STYLES/ATTRIBUTES OF THIS PARTICULAR FONT.

| FAMILY | WEIGHT | ITALIC | WIDTH | ULINE | OVER | BOX | COLOR | BASE | SIZE |
   |---|---|---|---|---|---|---|---|---|---|

A. FAMILY
      THIS IS THE FAMILY NAME OF THE FONT, SUCH AS HELVETICA, TIMES ROMAN, AND MINCHO.

B. WEIGHT
      THIS INDICATES THE THICKNESS OF THE STROKES OF THE CHARACTERS IN THE FONT. VALUES CAN BE MEDIUM OR BOLD.

C. ITALIC
      THIS INDICATES WHETHER THE FONT IS ITALIC OR UPRIGHT.

D. WIDTH
      THIS INDICATES THE WIDTH OF THE CHARACTERS IN THE FONT.

E. ULINE
      INDICATES THE TYPE OF UNDERLINE USED FOR UNDERLINING THE CHARACTERS IN THIS FONT. VALID TYPES OF LINES ARE: OFF, SOLID, DOTTED, DASHED, AND DASH-DOTTED.

F. OVER
      INDICATES THE TYPE OF OVERSTRIKING USED FOR OVERSTRIKING THE CHARACTERS IN THIS FONT. VALID TYPES OF LINES ARE: OFF, SOLID, DOTTED, DASHED, AND DASH-DOTTED.

G. BOX
      INDICATES THE TYPE OF BOX USED FOR BOXING THE CHARACTERS IN THIS FONT. VALID TYPES OF BOXES ARE: OFF, SOLID, DOTTED, DASHED, AND FILLED.

| FIG. 7A |
|---|
| FIG. 7B |
| FIG. 7C |

FIG. 7A

701:
| 0 | SBCS | NORM | ENGLISH | 1 | 17 | PREV TEXT NODE | NEXT TEXT NODE | → THIS IS JAPANESE. |

FONT INDEX → 711:
| FONT ATTRIBUTES | FONT METRICS | 850 | NEXT FONT |

| TIMES ROMAN | MED-IUM | OFF | NOR-MAL | OFF | OFF | OFF | BLACK | BASE | 36 |

702:
| 0 | DBCS | NORM | HIRAGANA | 2 | 20 | PREV TEXT NODE | NEXT TEXT NODE | → H1...H10 |

FONT INDEX → 712:
| FONT ATTRIBUTES | FONT METRICS | 942 | NEXT FONT |

| MINCHO | MED-IUM | OFF | NOR-MAL | OFF | OFF | OFF | BLACK | BASE | 30 |

703:
| 0 | DBCS | NORM | HIRAGANA | 3 | 18 | PREV TEXT NODE | NEXT TEXT NODE | → H11...H19 |

FONT INDEX → 713:
| FONT ATTRIBUTES | FONT METRICS | 942 | NEXT FONT |

| MINCHO | BOLD | OFF | NOR-MAL | OFF | OFF | OFF | BLACK | BASE | 30 |

This is Japanese. これはにほんごです。

きょうははれです。 It's fine today.

Electronic Calculator 電子計算機

私はアメリカに友人(Friend)がいます。

METHOD FOR ALLOWING SINGLE-BYTE CHARACTER SET AND DOUBLE-BYTE CHARACTER SET FONTS IN A DOUBLE-BYTE CHARACTER SET CODE PAGE

BACKGROUND OF THE INVENTION

1. Technical Field

The invention disclosed broadly relates to data processing systems and more particularly relates to an improved system and method for combining single-byte character set fonts and double byte character set fonts in a double-byte character set code page.

2. Background Art

Related copending patent application entitled "Style Component of a WYSIWYG Text Editor," by K. W. Borgendale, et al., filed May 14, 1990, assigned to IBM and incorporated herein by reference.

Related copending patent application entitled "Method and System for Storing Multiple, Modifiable Yomi and Kanji Strings in a Structured Document," by Chan S. Lim, et al., filed Oct. 29, 1992, assigned to IBM Corporation and incorporated herein by reference.

Current text editors allow double-byte character set fonts to be used in a double-byte character set code page in a mixed document which contains English and Kanji characters. Therefore, if an English document is created by a single-byte character set editor using single-byte character set fonts and that document is sent to an Asian country to be modified or viewed by a double-byte character set editor, the English text will not use the single-byte character set font that was originally used. Instead, it will use a double-byte character set font (such as Mincho) that is substitute for the single-byte character set font. This causes a fidelity problem when the document is displayed, formatted, or printed between the two editing parties.

OBJECTS OF THE INVENTION

It is therefore an object of the invention to provide an improved means for allowing use of both single-byte character set and double-byte character set fonts in a double-byte character set code page.

SUMMARY OF THE INVENTION

These and other objects, features and advantages are accomplished by the invention. The method of the invention allows both single-byte character set (SBCS) and double-byte character set (DBCS) fonts in a DBCS code page. The invention stores the SBCS and DBCS text of the document in separate areas. Each area contains the following specific information about the text: the actual text itself, the length and characters of the text, the horizontal starting position of the text, the font attributes for that, a flag to indicate that the text is SBCS or DBCS text, and the value which points to the next area containing some text. The font attributes contain information such as the font typeface name, point size, color, weight, width, and the value to indicate whether the font type is an SBCS or a DBCS font type. A document is then set up to use different fonts, SBCS or DBCS, for specific sections of text and alternating back and forth between the fonts as many times as is necessary. The text of the document that uses the different fonts will be in separate areas and each area will contain its own text and font specific information.

DESCRIPTION OF THE FIGURES

These and other objects, features and advantages will be more fully appreciated with reference to the accompanying figures.

FIG. 2 is a data format diagram of a generic text node.

DISCUSSION OF THE PREFERRED EMBODIMENT

Figure 1:
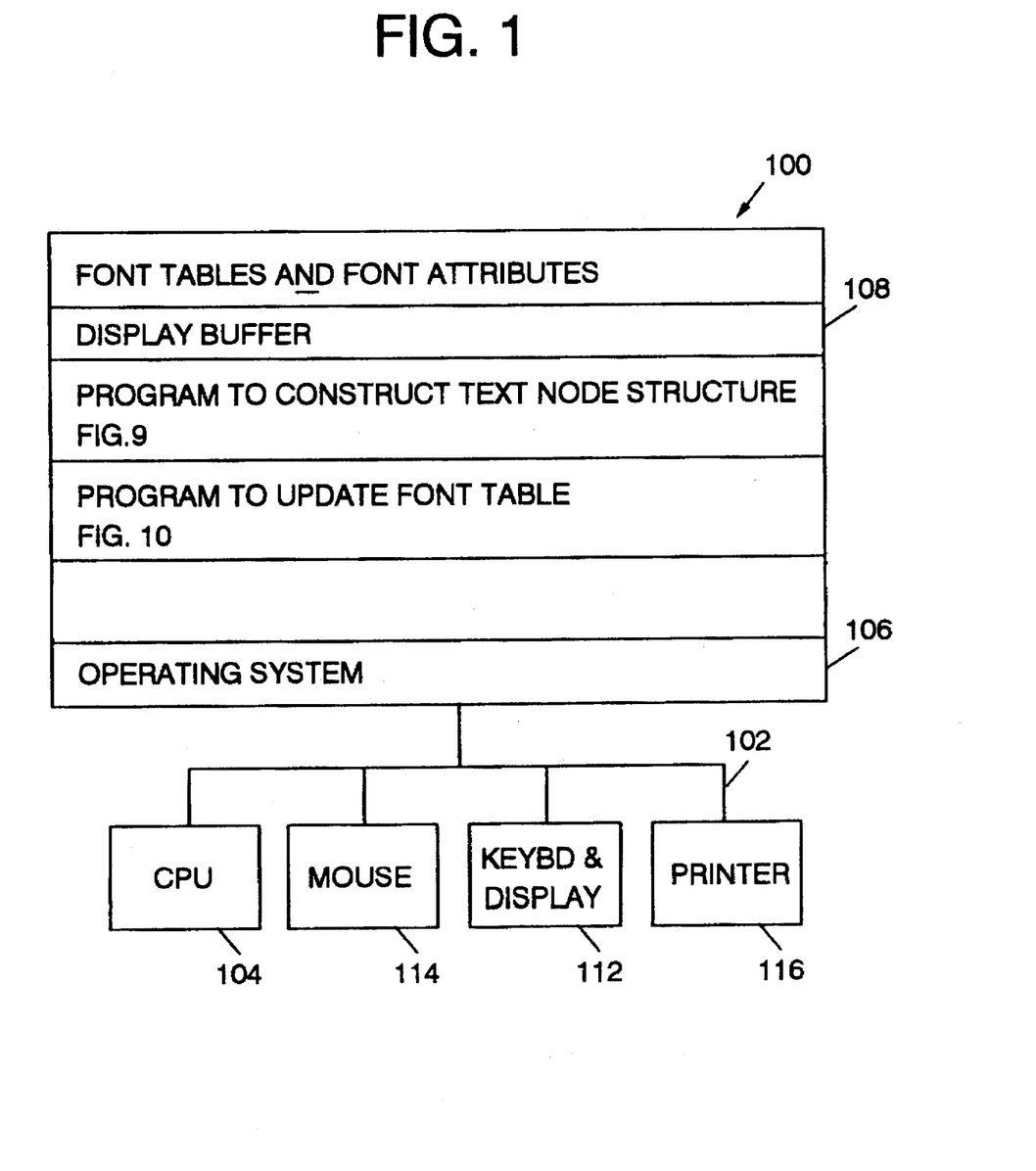
FIG. 1 is an architectural diagram of a data processing system for carrying out the invention.

The overall architectural diagram of a system for carrying out the invention is shown in FIG. 1. A memory 100 is coupled over a bus 102 to a CPU 104. The memory 100 includes programs which are a sequence of executable instructions which embody the flow diagrams shown in FIGS. 9 and 10. Also included in the memory is an operating system 106, a display buffer 108, and font tables and font attributes for text nodes created in accordance with the invention. Also shown in the architectural diagram of FIG. 1 is a keyboard and display 112, a mouse pointing device 114, and a printer 116.

The example 1 table shows an English document using SBCS fonts of Times Roman, Helvetica, and Courier, which was created by an SBCS editor. The example 2 table shows the English document that was used in the example 1 table, when it is viewed or modified using a DBCS editor. The document's fidelity has not been maintained and the document looks different when it is displayed, formatted or printed. This is because the DBCS editor has substituted the Mincho font which is a model spaced font, for all of the document's original SBCS fonts.

FIG. 2 is a basic representation of a text node data format. Not all fields are represented: only those relevant to the current inventions.

LINGUIST—This indicates whether the text in this text node is spelled correctly or it has a spelling error.

SBCS/DBCS—Indicates whether this text node contains single-byte text or double-text. Text of different sizes will not appear in the same text node.

YOMI/KANJI/NORM/CRTL—Indicates the state that the text in the current text node is in:

YOMI: Text (usually Hiragana or Katakana) which has been entered in conversion mode but which has not yet been converted to Kanji. Text will remain in this state regardless of the users' actions, unless he converts it, normalizes it, or deletes it.

KANJI: Text which has been converted to Kanji characters from Yomi but which has not yet been normalized. Text in this state will still reference all of the necessary information to perform and will remain in this state until the user unconverts it, normalizes it, or deletes it.

NORM: Text which is neither in YOMI or KANJI state. This is the standard state of English text and of Japanese text which will no longer be used in any conversion routines.

CTRL: Text which is control information containing the original Yomi which converted to a particular Kanji phrase and other control data passed back from the system conversion routines. There is one of these text nodes attached to each Kanji state phrase in the document and they are not displayed. They contain all the information necessary to do further Kana-Kanji conversion routines on the associated Kanji phrase if requested.

Text of different states will never exist in the same text node.

HIRAGANA/KATAKANA/KANJI/ENGLISH—Indicates the language and type of characters in the text node. Hiragana and Katakana are phonetic character sets used for converting to Kanji. Kanji is the full set of Japanese language ideographic characters. English is English. Text in different languages/types will never exist in the same text node.

FONT INDEX—This is an index into the font table which gives all of the font information for the text in the current text node. Text of different fonts will never exist in the same text node. The details of the font table will be described below.

THE LENGTH—This is the length, in bytes, of the actual text in the current text node.

PREVTHXT NODE—This is a pointer to the previous text node in the document.

NEXT THXTNODE—This is a pointer to the next node in the document.

THE POINTER—This is a pointer to a memory area which contains the actual text data in this text node.

Figure 3:
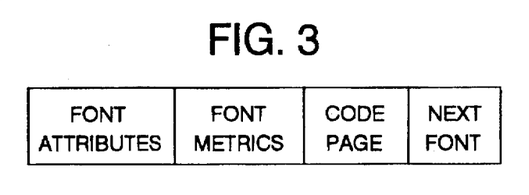
FIG. 3 shows the layout of a font table.

FIG. 3 is a basic representation of a font table entry. Not all fields are represented: only those relevant to the current invention.

1. FONT ATTRIBUTES

Figure 4:
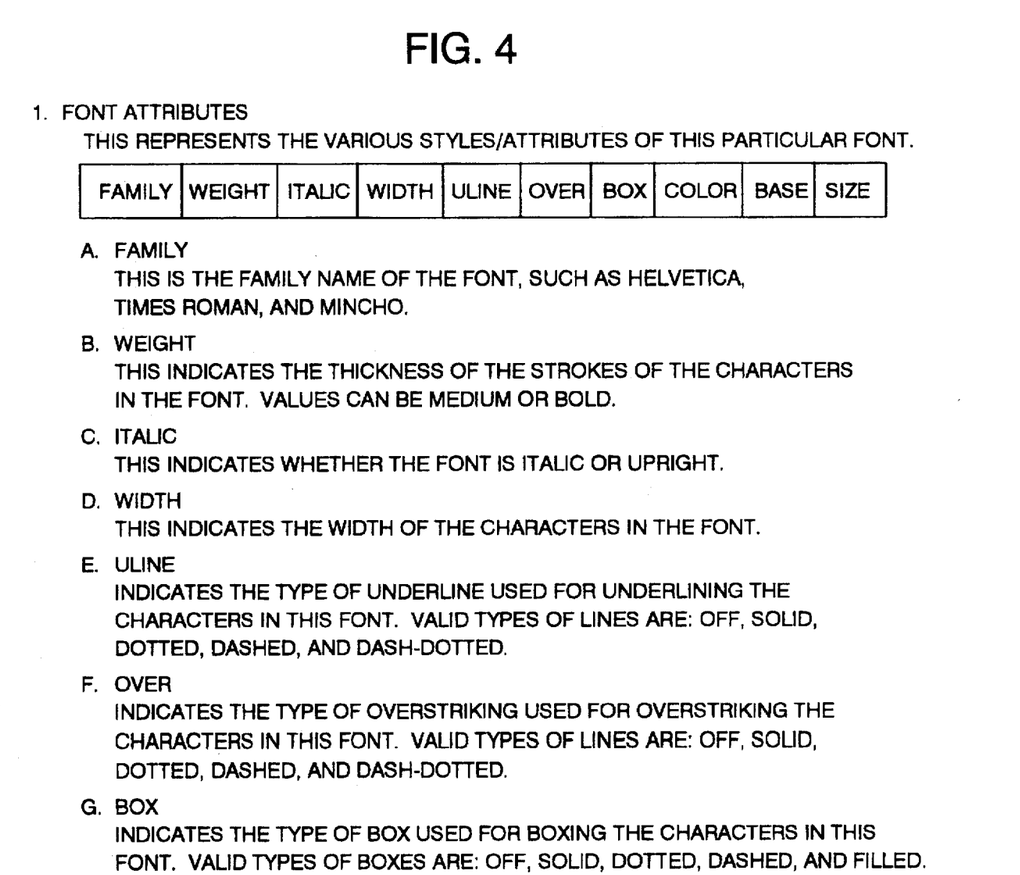
FIG. 4 shows the layout of a font attribute for the particular fonts specified in the font table of FIG. 3.

FIG. 4 represents the various styles/attributes of this particular font.

FAMILY—This is the family name of the font, such as Helvetica, Times Roman, and Mincho.

WEIGHT—This indicates the thickness of the strokes of the characters in the font. Values can be medium or bold.

ITALIC—This indicates whether the font is italic or upright.

WIDTH—This indicates the width of the characters in the font.

ULINE—Indicates the type of underline used for underlying the characters in this font. Valid types of lines are: off, solid, dotted, dashed, and dash-dotted.

OVER—Indicates the type of overstrike used for overstriking the characters in this font. Valid types of lines are: off, solid, dotted, dashed, and dash-dotted.

BOX—Indicates the type of box used for boxing the characters in this font. Valid types of boxes are: off, Solid, dotted, dashed, and filled.

COLOR—This is the color of the font.

BASE—This indicates the position of the characters of the font relative to the base line:

BASE: Characters are positioned at the base line.
SUPER: Characters are positioned above the base line.
SUB: Characters are positioned below the base line.

SIZE—This indicates the size of the fonts in points. A point is a unit of measure which is 1/72 of an inch.

2. FONT METRICS

This is a pointer to a memory area which contains the metrics of this particular font such as the font average width, capital letter height, lower case height, character widths, etc. These metrics are used when displaying the characters to determine the character positions.

3. CODE PAGE

The code page supported by this font. Code pages define the character set containing characters used by that particular country or language. For example, Japanese—code page 942; Korean—code page 944, and Multilingual—code page 850.

4. NEXT FONT

This is a pointer to the next font entry in the font table. These text nodes and font table entries will be used to describe the storage of text and fonts in a structured document and to demonstrate how the document structure changes to allow SBCS and DBCS text to exist simultaneously in the document with different SBCS and DBCS fonts in a DBCS code page.

EXAMPLES

The following examples describe the accompanying figures and demonstrate the internal structures necessary to support the inventions. The following conventions are used:

K#=A Kanji character

English characters will be represented as is

Each figures will show the sequence of text nodes, which represent the given string, and the font table entries, which represent the font attributes, stored in memory.

Figure 5:
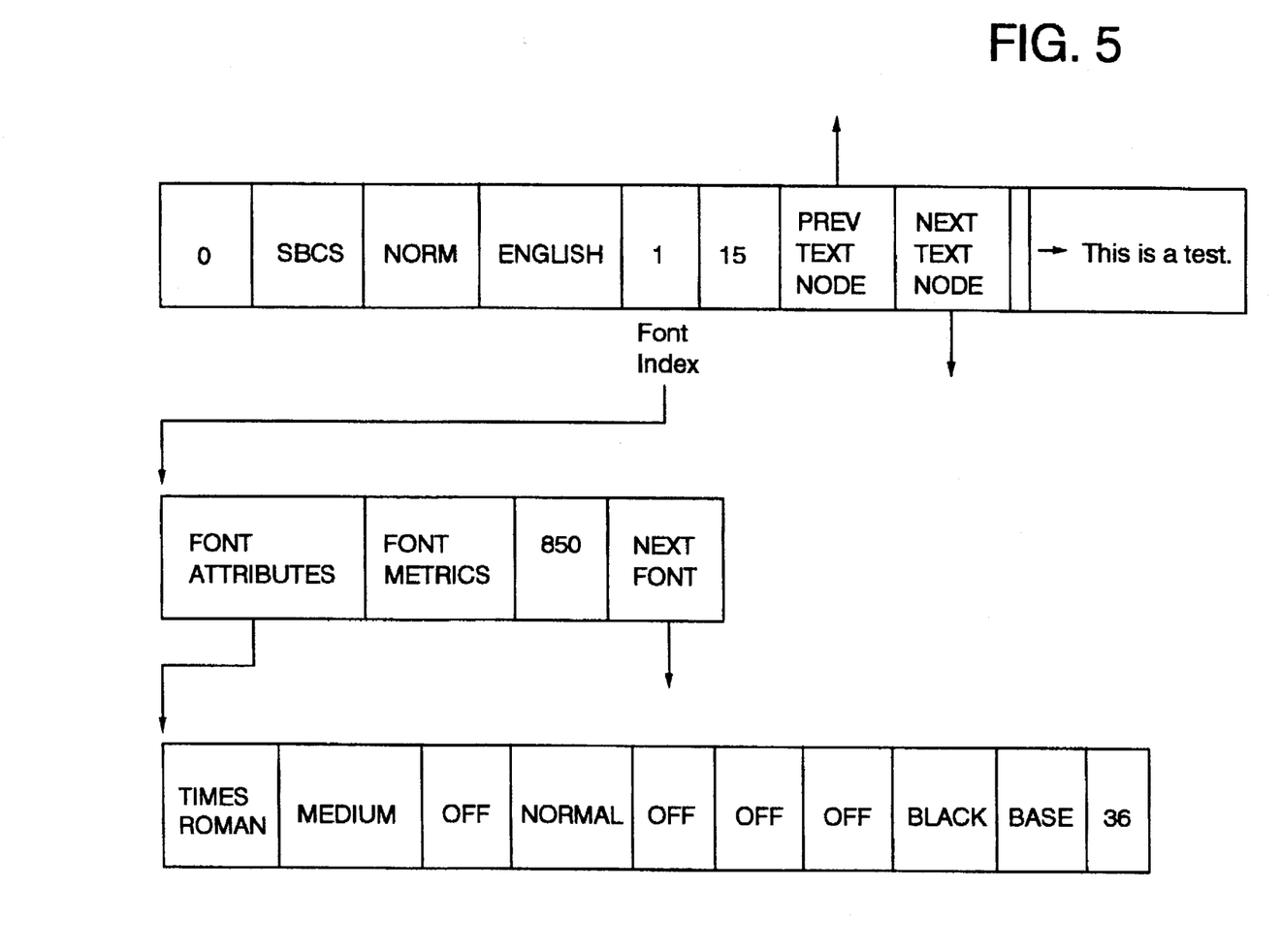
FIG. 5 shows the text node and its corresponding font table and attributes for SBCS text using an SBCS font, as set forth in greater detail in Table 1.

FIG. 5 illustrates a text node for SBCS text using an SBCS font, and the corresponding font table and font attributes. Reference should be made to Table 1 which gives greater detail about the contents of the various portions of FIG. 5.

Table 1 for FIG. 5
Single-Byte Text Using a Single-Byte Font

This text string is English text. All of the text is represented by one text node. The font being used has the following attributes set:
Code Page - 850

| Family | Times Roman |
|---|---|
| Weight | medium |
| Italic | off |
| Width | normal |
| Uline | off |
| Over | off |
| Box | off |
| Color | Black |
| Base | base |
| Size | 36 point |

These attributes are stored in the font table entry 1 which is the font index stored in the text node.

Figure 6:
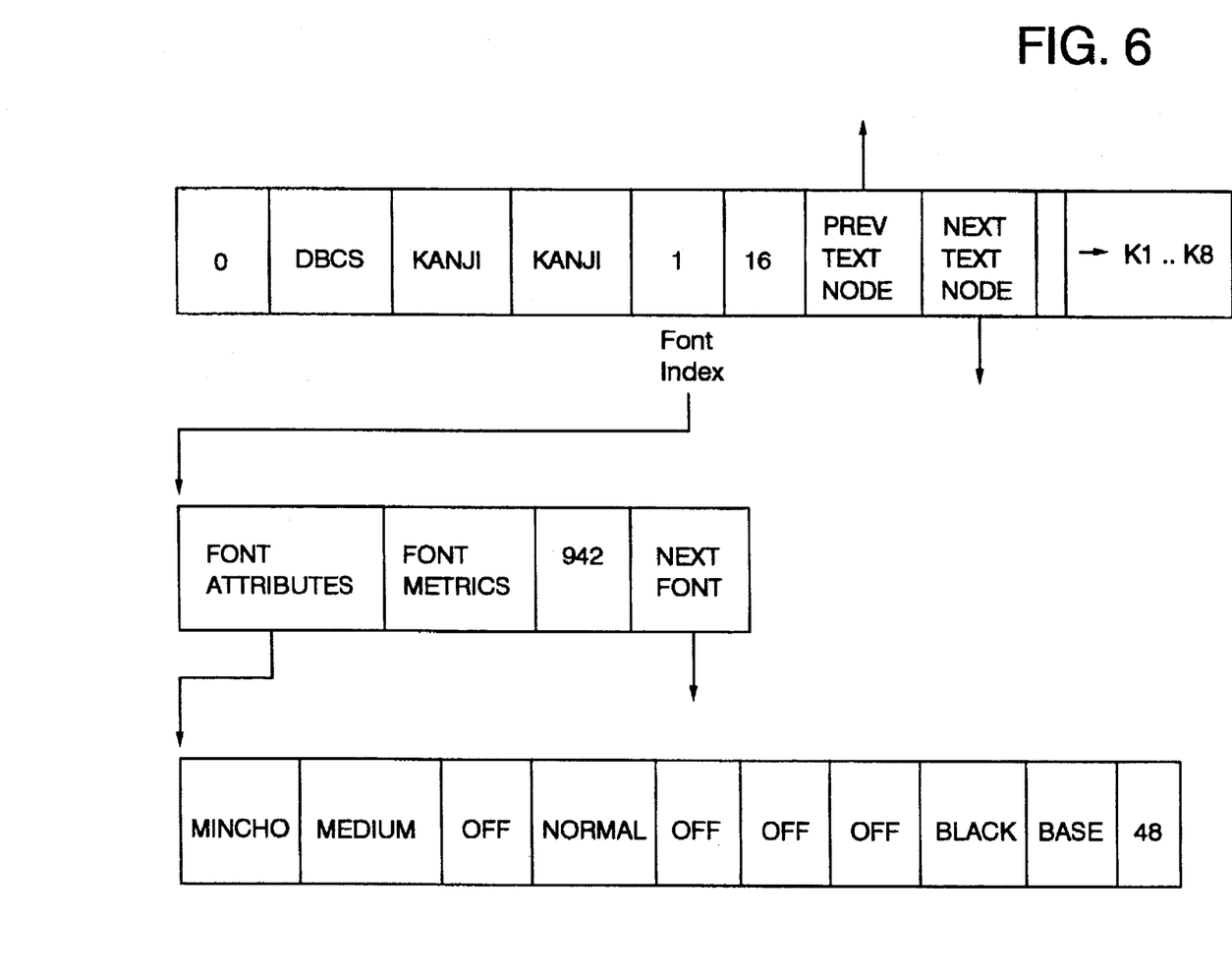
FIG. 6 illustrates a text node and the corresponding font table attributes for DBCS text using a DBCS font, as described in greater detail in Table 2.

FIG. 6 illustrates a text node and the corresponding font table and font attributes for DBCS text using a DBCS font. Reference should be made to Table 2 which shows greater detail of the contents of FIG. 6.

Table 2 for FIG. 6
Double-Byte Text Using & Double-Byte Font

This text string is double-byte Kanji text in Kanji state. All of the text is represented by one text node. The font being used has the following attributes set:
Code Page - 942

| | |
|---|---|
| Family | Mincho |
| Weight | medium |
| Italic | off |
| Width | normal |
| Uline | off |
| Over | off |
| Box | off |
| Color | Black |
| Base | base |
| Size | 48 point |

These attributes are stored in the font table entry 1 which is the font index stored in the text node.

Figures 7, 7A:
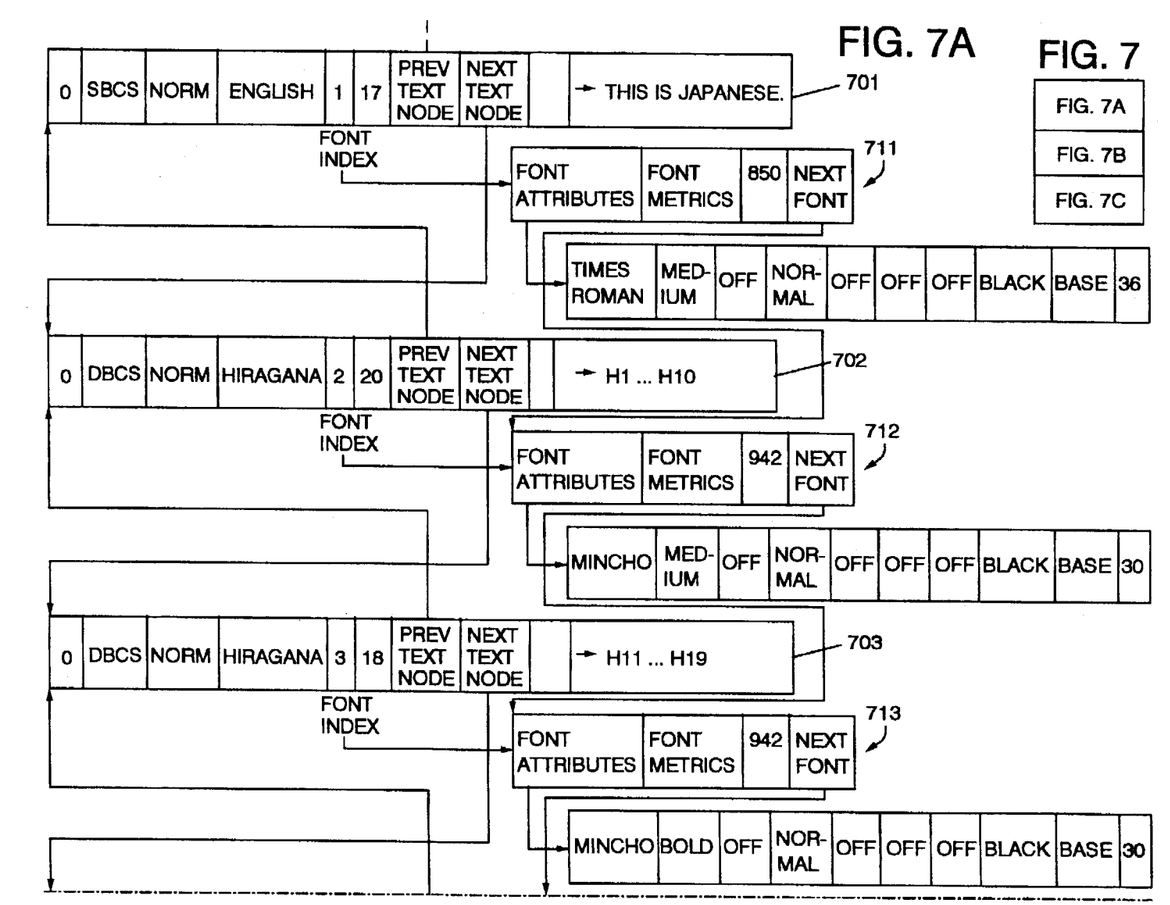
FIG. 7 illustrates five sequential text nodes and their corresponding font tables and attributes for mixed text containing both SBCS and DBCS fonts, as set forth in greater detail in Table 3.
Figure 7B:
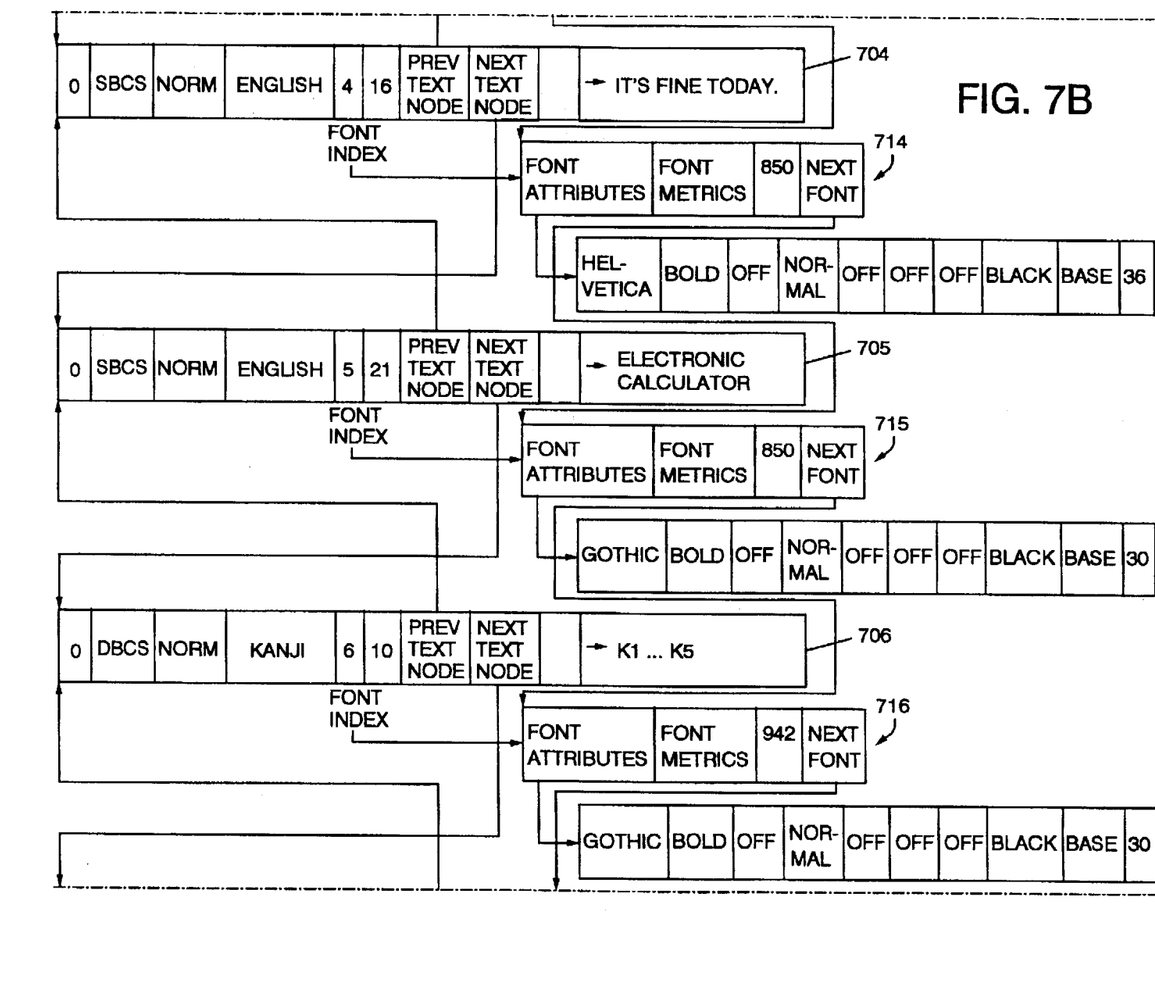
Figure 7C:
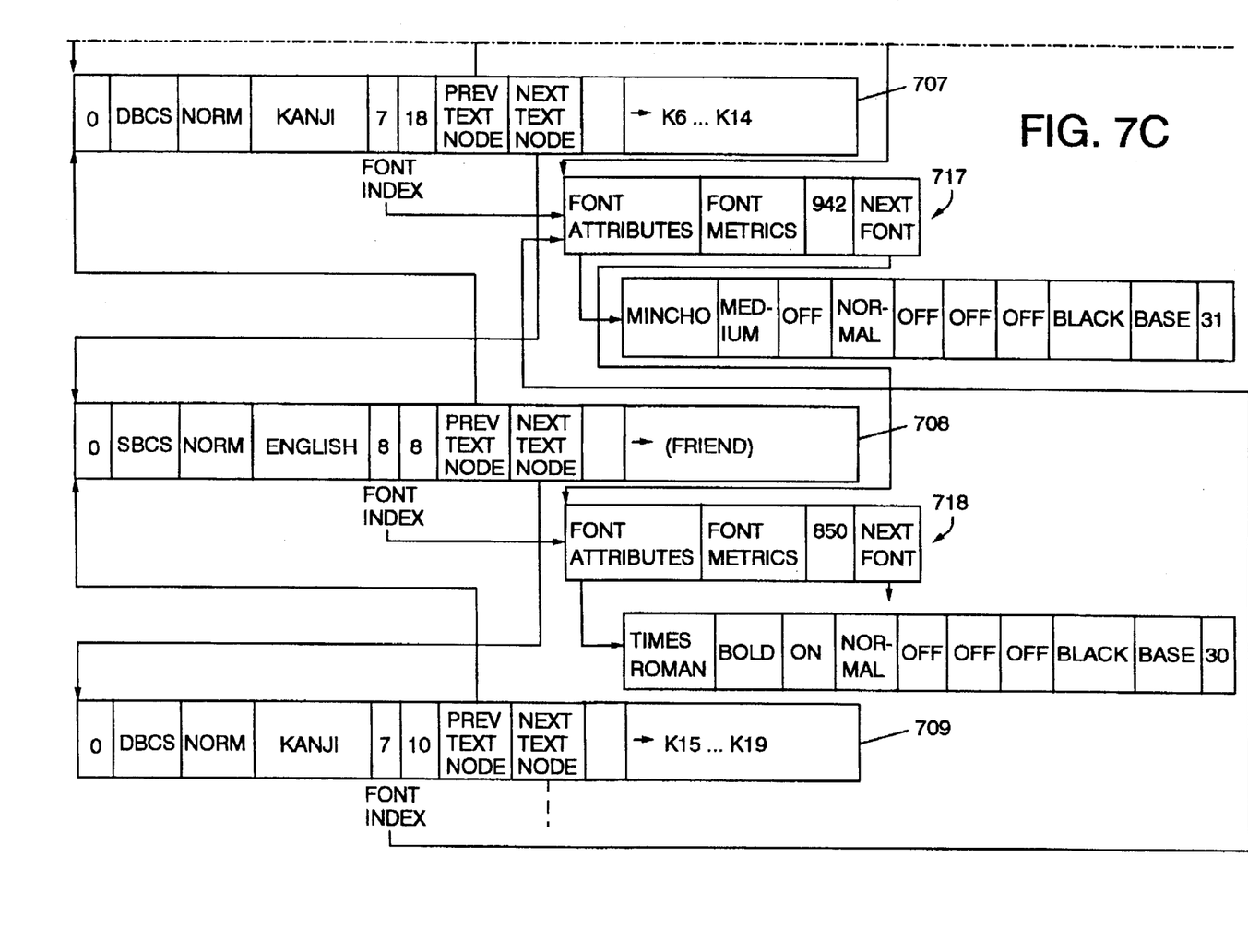
Figure 8:
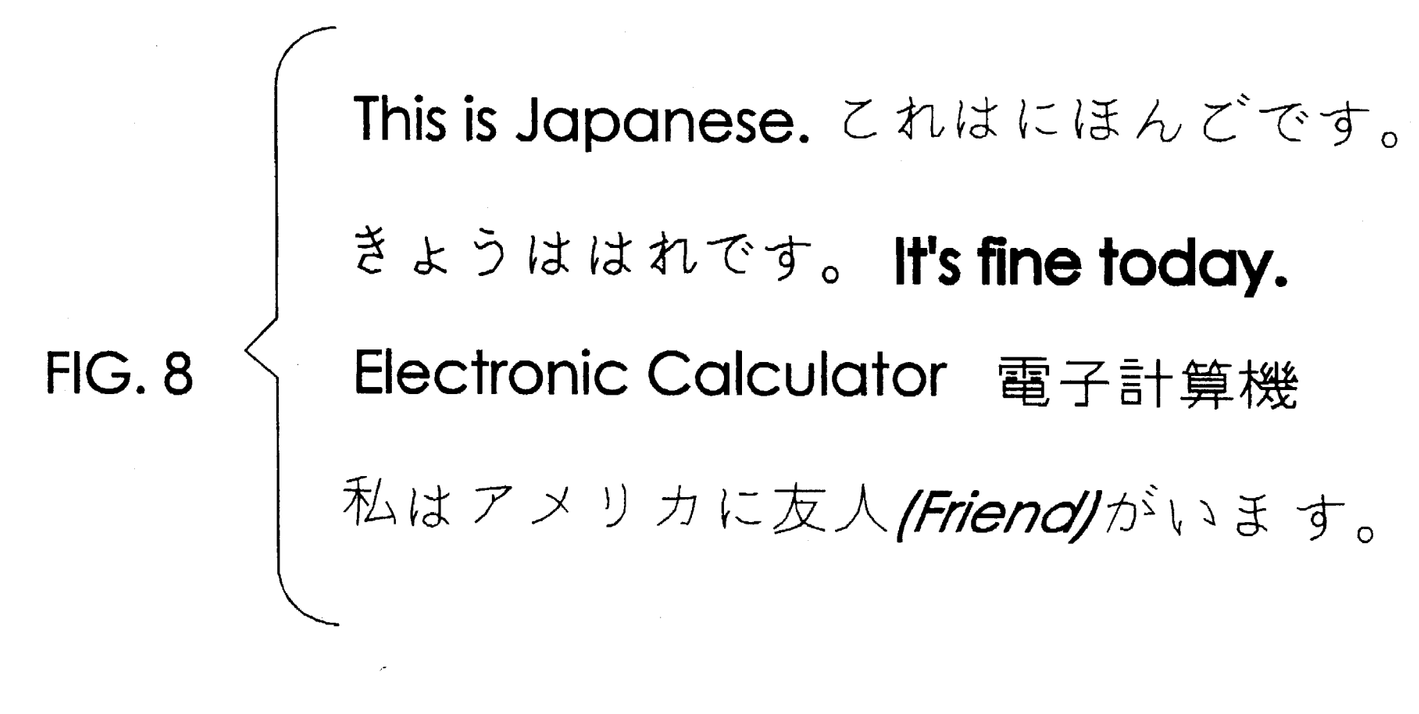
FIG. 8 illustrates the WYSIWYG appearance of the mixed text whose text nodes are illustrated in FIG. 7.

FIG. 7 illustrates a sequence of nine text nodes and their corresponding font tables and font attributes for a mixed text of SBCS and DBCS characters. Reference should be made to Table 3 to illustrate in more detail the contents of the various portions of FIG. 7. Still further, FIG. 8 illustrates the WYSIWYG ("what you see is what you get") appearance of the text which is specified by the text nodes illustrated in FIG. 7.

TABLE 3

Mixed Single/Double-Byte Text Using Mixed Single/Double-Byte Fonts

This text string consists of the following: A single-byte English string in normal state taking up one text node 701. The font being used has the following attributes:
Code Page - 850

| | |
|---|---|
| Family | Times Roman |
| Weight | medium |
| Italic | off |
| Width | normal |
| Uline | off |
| Over | off |
| Box | off |
| Color | Black |
| Base | base |
| Size | 36 point |

These attributes are stored in the font table entry 711 which is the font index stored in the text node.

A double-byte Hiragana string in normal state taking up one text node 702. The font being used has the following attributes:

Code Page - 942

| | |
|---|---|
| Family | Mincho |
| Weight | medium |
| Italic | off |
| Width | normal |
| Uline | off |
| Over | off |
| Box | off |
| Color | Black |
| Base | base |
| Size | 30 point |

These attributes are stored in the font table entry 712 which is the font index stored in the text node.

A second double-byte Hiragana string in normal state taking up one text node 703. The font being used has the following attributes:

Code Page - 942

| | |
|---|---|
| Family | Mincho |
| Weight | bold |
| Italic | off |
| Width | normal |
| Uline | off |
| Over | off |
| Box | off |
| Color | Black |
| Base | base |
| Size | 30 point |

These attributes are stored in the font table entry 713 which is the font index stored in the text node.

A second single-byte English string in normal state taking up one text node 704. The font being used has the following attributes:

Code Page - 850

| | |
|---|---|
| Family | Helvetica |
| Weight | bold |
| Italic | off |
| Width | normal |
| Uline | off |
| Over | off |
| Box | off |
| Color | Black |
| Base | base |
| Size | 36 point |

These attributes are stored in the font table entry 714 which is the font index stored in the text node.

A third single-byte English string in normal state taking up one text node 705. The font being used has the following attributes:

Code Page - 850

| | |
|---|---|
| Family | Gothic |
| Weight | bold |
| Italic | off |
| Width | normal |
| Uline | off |
| Over | off |
| Box | off |
| Color | Black |
| Base | base |
| Size | 30 point |

These attributes are stored in the font table entry 715 which is the font index stored in the text node.

A double-byte Kanji string in normal state taking up one text node 706. The font being used has the following attributes:

Code Page - 942

| | |
|---|---|
| Family | Gothic |
| Weight | bold |
| Italic | off |
| Width | normal |
| Uline | off |
| Over | off |
| Box | off |
| Color | Black |
| Base | base |
| Size | 30 point |

These attributes are stored in the font table entry 716 which is the font index stored in the text node.

A second double-byte Kanji string in normal state taking up one text node 707. The font being used has the following attributes:

| Code Page - 942 | |
| --- | --- |
| Family | Mincho |
| Weight | medium |
| Italic | off |
| Width | normal |
| Uline | off |
| Over | off |
| Box | off |
| Color | Black |
| Base | base |
| Size | 31 point |

These attributes are stored in the font table entry 717 which is the font index stored in the text node.

A fourth single-byte English string in normal state taking up one text node 708. The font being used has the following attributes:

| Code Page - 850 | |
| --- | --- |
| Family | Times Roman |
| Weight | bold |
| Italic | off |
| Width | normal |
| Uline | off |
| Over | off |
| Box | off |
| Color | Black |
| Base | base |
| Size | 30 point |

These attributes are stored in the font table entry 718 which is the font index stored in the text node.

A third double-byte Kanji string in normal state taking up one text node 709. A font being used has the following attributes:

| Code Page - 942 | |
| --- | --- |
| Family | Mincho |
| Weight | medium |
| Italic | off |
| Width | normal |
| Uline | off |
| Over | off |
| Box | off |
| Color | Black |
| Base | base |
| Size | 31 point |

These attributes are stored in the font table entry 717 which is the font index stored in the text node. Since this text has the same font attributes as the second double-byte Kanji string, the font attribute table entry is reused by storing the same font index in the text node.

Figure 9:
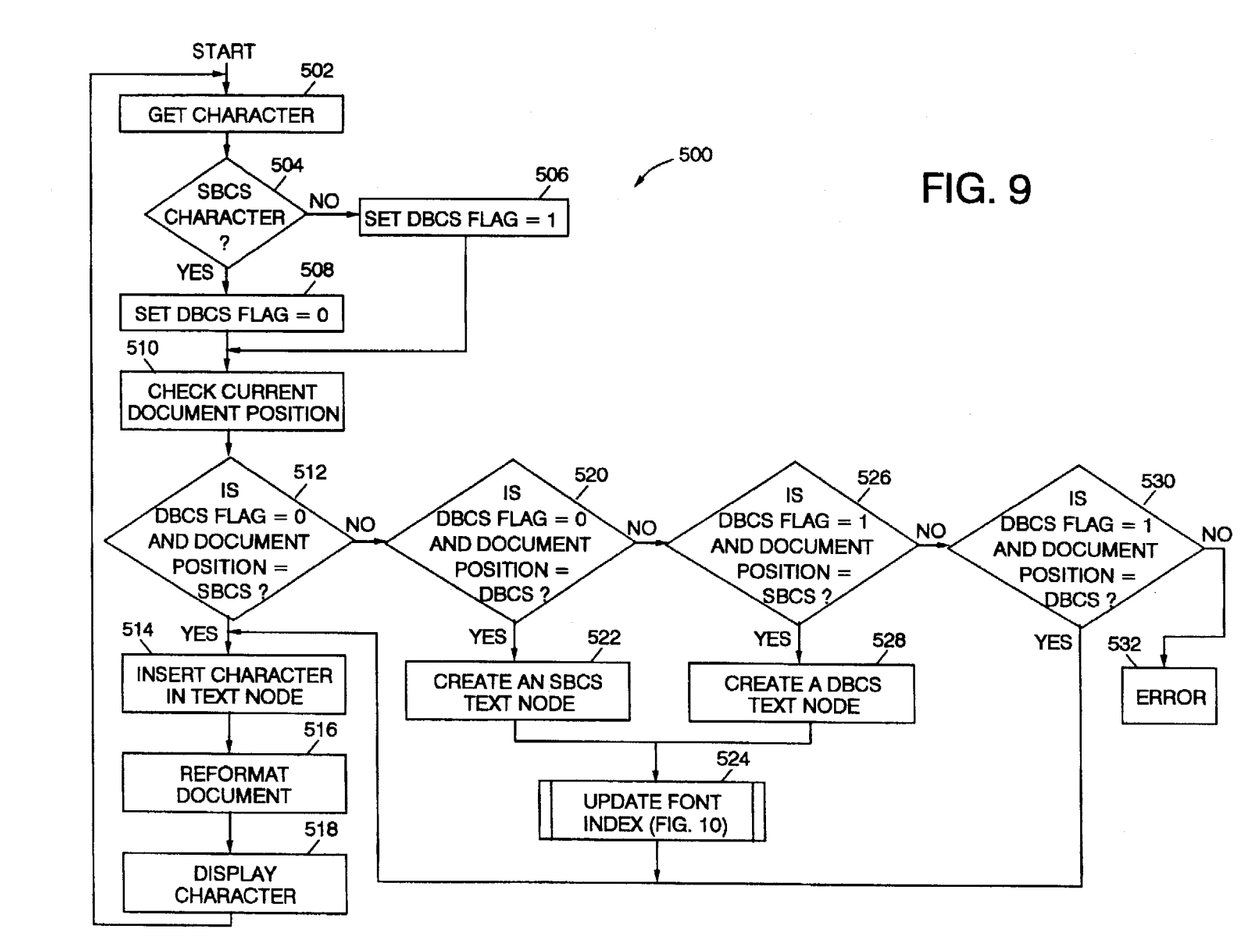
FIG. 9 is a flow diagram of a sequence of operational steps which carry out the process of creating an SBCS and DBCS font index, in accordance with the invention.

FIG. 9 is a flow diagram of the sequence of operational steps for the method 500 which is a method for creating SBCS and DBCS font index. The method 500 of FIG. 9 creates the text nodes for characters as they are typed into the system shown in FIG. 1. As the operator types in characters, if the operator switches fonts or switches the character set, the method of FIG. 9 will adapt to that and generate additional sequential text nodes to define the text and to faithfully reproduce the WYSIWYG appearance of the text.

FIG. 9 starts with step 502 which gets a character, usually from the keyboard 112. Then step 504 determines whether the typed character is an SBCS character. If it is not, then step 506 sets the DBCS flag to one. Alternately, if it is an SBCS character, then step 508 sets the DBCS flag to zero. Then step 510 checks the current document position. The current document position is the current location of the cursor in the editor. As the operator sequentially types characters into the editor, the document position advances and corresponds to the cursor position shown on the display of the system. Then in step 512, it is determined whether the DBCS flag is set to 0 and the document position is in an SBCS area of the text being typed. If it is, then the method flows to step 514 which inserts the character in the text node. For example, in FIG. 5, the next character will be inserted into the text node of the SBCS text node illustrated. Then in step 516 of FIG. 9, if it is appropriate, such as at the end of a line, the document is reformatted. This can for example be a word wrap operation where if the word extends beyond the right hot zone, then the entire word is transferred to the beginning of the left margin on the next line. Then in step 518, the character is displayed in WYSIWYG form on the monitor of the system. Then step 518 flows back to the beginning of the method 500 of FIG. 9, to get the next character in step 502.

If step 512 was not satisfied, that is if either the DBCS flag is not zero or the document position is not SBCS, then step 512 flows to step 520. In step 520, a determination is made whether the DBCS flag is set to zero and the document position is DBCS. If it is, then step 522 creates an SBCS text node. Reference can be made at this point to FIG. 6 which shows the beginning condition and FIG. 5 which shows the next condition resulting from step 522. If step 520 determines that the current character is an SBCS character and that the document position is currently DBCS, then the current text node is similar to that shown in FIG. 6. But this is not an SBCS text node. Therefore, step 522 creates the next consecutive text node which is an SBCS text node such as is shown in FIG. 5. The character which has been typed, which is an SBCS character, is the first character inserted into the text character portion of the text node illustrated in FIG. 5. Then step 524 executes the process of FIG. 10, which updates the SBCS or DBCS font table entry. The process of FIG. 10 will be described below, after further describing the rest of the steps in the flow diagram of FIG. 9.

In the flow diagram of FIG. 9, if step 520 determines that the DBCS character is not equal to the zero or that the document position is not DBCS, then step 520 flows to step 526. Step 526 determines whether the DBCS flag is set equal to one and whether the document position is SBCS. If both of these conditions are satisfied, then step 526 flows to step 528 which creates the DBCS text node. In a sense, this is a mirror image of the transition from step 520 to step 522. When step 526 transitions to step 528, it has been determined that there is the character which has just been typed is a DBCS character and yet the document position is currently at SBCS portion of the text. Reference can be made to FIG. 5 which shows the before condition and FIG. 6 which shows the after condition from the execution of step 528 of FIG. 9. If the current document position is SBCS, then the text node shown in FIG. 5 is currently being filled, for SBCS text. Since the new character which has just been typed is determined to be a DBCS character, step 528 creates a DBCS text node such as is shown in FIG. 6 and the currently typed character is now the first character to be inserted into the text portion of the text node shown in FIG.

6. Then step 528 of FIG. 9 transfers to step 524. As previously mentioned, step 524 will be discussed below. After step 524 has been executed, the process 500 of FIG. 9 flows to step 514 and the new character is inserted into the text node which has just been created. Steps 514, 516 and 518 have been previously described.

If step 526 in FIG. 9 is not satisfied, that is if either the DBCS flag is not equal to one or the document position is not SBCS, then step 526 flows to step 530. Step 530 determines whether the DBCS flag is set equal to one and whether the document position is DBCS. If that condition is satisfied, then step 530 flows to step 514 and the DBCS character is inserted into the DBCS text node currently being filled. If step 530 is not satisfied, then all of the possible values for the DBCS flag and the document position have been tested and an error has been made so the process 500 flows to step 532 to process an error condition.

Figure 10:
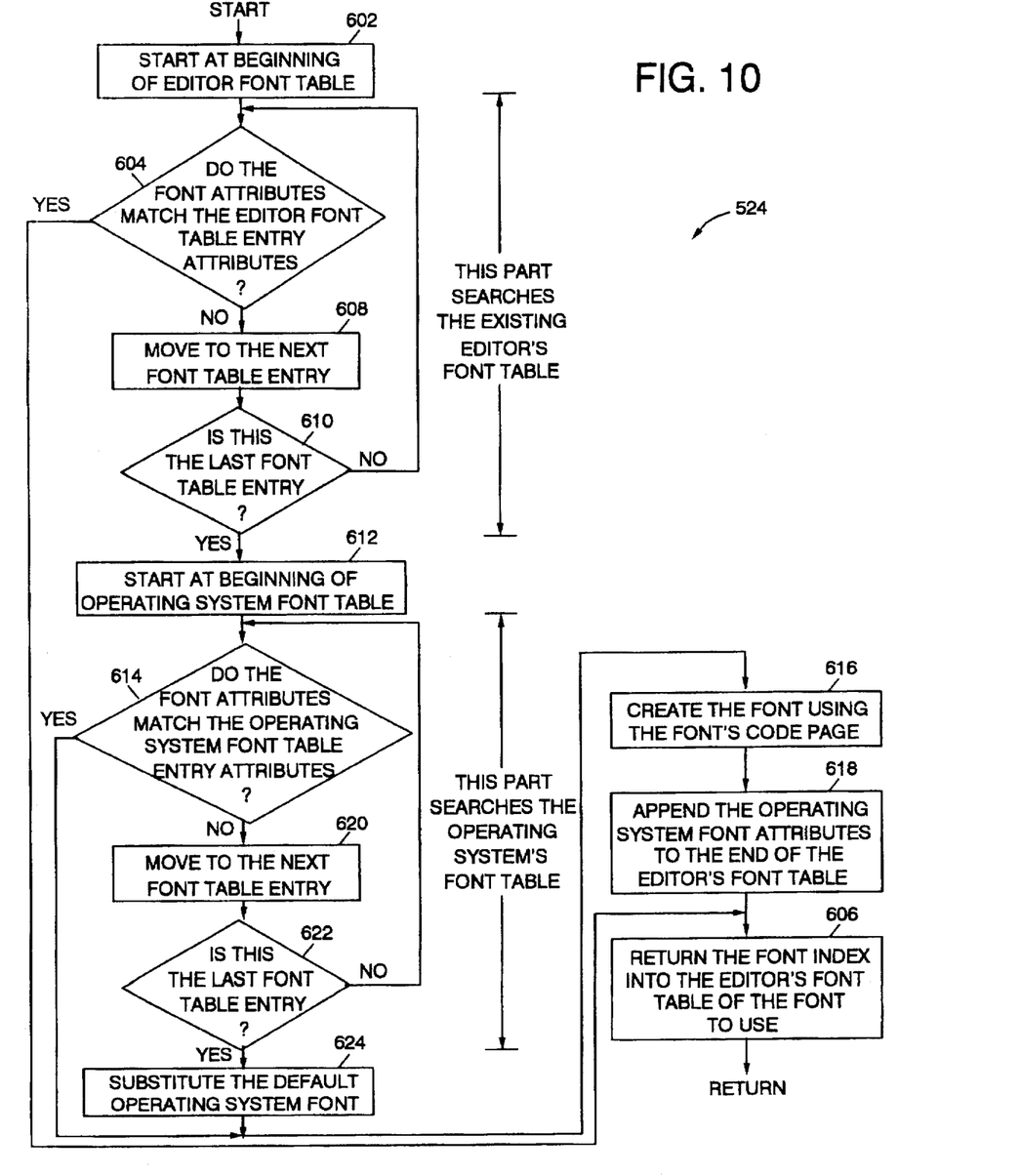
FIG. 10 is a flow diagram of a sequence of operational steps for carrying out the updating or creating of an SBCS or DBCS font table entry, in accordance with the invention.

FIG. 10 carries out the process 524 in the step 524 of FIG. 9. The process 524 of FIG. 10 is a method for updating or creating a new SBCS or DBCS font table entry, such as those not shown in FIGS. 3 and 4. The process 524 of FIG. 10 begins with step 602 which starts at the beginning of the editor font table. Then step 604 determines whether the font attributes match the editor font table entry attributes. If they do, then the flow proceeds from step 604 to step 606 which returns the font index into the editor's font table of the font to use and the program returns to the flow diagram 500 of FIG. 9. Alternately, if step 604 determines that the font attributes do not match the editor font table entry attributes, then the process of FIG. 10 flows to step 608 which moves to the next font table entry. Step 608 then transitions to step 610 which determines if this is the last font table entry. If it is not, then step 610 flows back to the beginning of step 604 to determine if the font attributes match the editor font table entry attributes. Alternately, if step 610 determines that this is the last font table entry, then the process 524 of FIG. 10 flows to step 612 which starts the beginning of the operating system font table. The operating system in this example, can be the IBM OS/2 Operating System, which contains a large font table which includes both SBCS and DBCS fonts. Then step 612 transitions to step 614 which determines whether the font attributes match the operating system font table entry attributes. If they do, then step 614 transitions to step 616, which creates the font using the font's code page. Then step 616 transitions to step 618 which appends the operating system font attributes to the end of the editor's font table. Then step 618 transitions to step 606 which returns the font index into the editor's font table of the font to use. Then the process of FIG. 10 returns to the process previously described in FIG. 9.

If step 614 determines that the font attributes do not match the operating system font table entry attributes, then step 614 transitions to step 620 which moves to the next font table entry in the operating system font table. Step 620 then transitions to step 622 which determines whether this is the last font table entry for the operating system font table. If it is not, then step 622 transitions to the beginning of step 614 to determine if the font attributes match the operating system font table entry attributes. Alternately, if step 622 determines that this is the last font table entry for the operating system font table, then step 622 transitions to step 624 which substitutes a default operating system font. A default operating font can be any alternate font which will represent the meaning of the originating author's text but which cannot be replicated by the fonts currently stored in the system. Step 624 then transitions to steps 616, 618 and 606, which have been previously described. Then the process 524 of FIG. 10 returns to the flow diagram illustrated in FIG. 9.

Although a specific embodiment of the invention has been disclosed, it will be understood by those having skill in the art that changes can be made to that specific embodiment without departing from the spirit and the scope of the invention.

What is claimed is:

1. A method for editing a structured document which presents SINGLE-BYTE CHARACTER SET SBCS and DOUBLE-BYTE CHARACTER SET DBCS character types having named fonts and attributes using a DBCS code page, comprising the steps of:

inputting a first alphanumeric character as an input character;

determining said input character's font name and attributes and whether said input character's type is SBCS or DBCS;

determining whether the current document position text node type is SBCS or DBCS;

inserting said input character into the current document position's text node if said input character type is determined to match said current document position's text node type, and said input character's font name and attributes match an existing entry in said current document position's text node font table;

creating a new text node type matching that of said input character and inserting said input character therein if said input character's type does not match said current document position's text node type, or if said current document position's text node font table contains no match to said input character's font name and attributes; and displaying said input character at a next document position.

2. The method of claim 1 which further comprises the steps of:

in response to said step of creating a new text node, creating a font table having entry attributes which include the font name and one or more font attributes for said input character if no such matching font table entry already exists for said document.

3. The method of claim 1, which further comprises the steps of:

in response to said step of creating a new text node, creating a pointer to an existing font table entry having a font name and attribute match to said input character's font name and attributes when an existing document font table match is found.

* * * * *